Nov. 3, 1942.   R. H. GRIEST   2,300,546
DISPENSING DEVICE
Filed April 2, 1941

INVENTOR
R. H. GRIEST
BY
G. H. Heupt.
ATTORNEY

Patented Nov. 3, 1942

2,300,546

UNITED STATES PATENT OFFICE 2,300,546

DISPENSING DEVICE

Raymond H. Griest, Summit, N. J., assignor to Bell Telephone Laboratories, Incorporated, New York, N. Y., a corporation of New York Application April 2, 1941, Serial No. 386,392

5 Claims. (Cl. 221—114)

This invention relates to dispensing devices and the object of the invention is a dispensing device which is simple to operate and which is well adapted for accurately dispensing granular material such as the carbon used in transmitter buttons.

It has been found that for the proper operation of a transmitter of any given design the button should contain a very definite amount of carbon and once this quantity has been determined it is, of course, very desirable to be able to dispense the amount required quickly and repeatedly for successive buttons. It is also very important to avoid any unnecessary agitation of the carbon since agitation causes an abrading action between the particles and thereby materially reduces its efficiency and effective life in the button.

The dispenser, according to this invention, is adapted to be attached directly to a vial in which the prepared carbon is stored. The housing is preferably of circular cross-section and of considerable mass so as to serve as a stable base for the inverted vial and thereby make further inversions improbable and unnecessary until all the carbon has been dispensed. The measuring chamber is defined by inner and outer, relatively movable bushings within the housing and the inlet and outlet openings are closed by sharp edged members engaging sloping surfaces to stop the flow of the granular material. The construction is such that the inlet valve cannot open until the outlet valve is closed and the outlet valve cannot open to discharge the carbon until the inlet valve is closed. The springs for controlling these valves are mounted externally of the measuring chamber where they cannot abrade the carbon or impede its flow.

These and other features of the invention will be more clearly understood from the following detailed description and the accompanying drawing in which.

Figure 1:
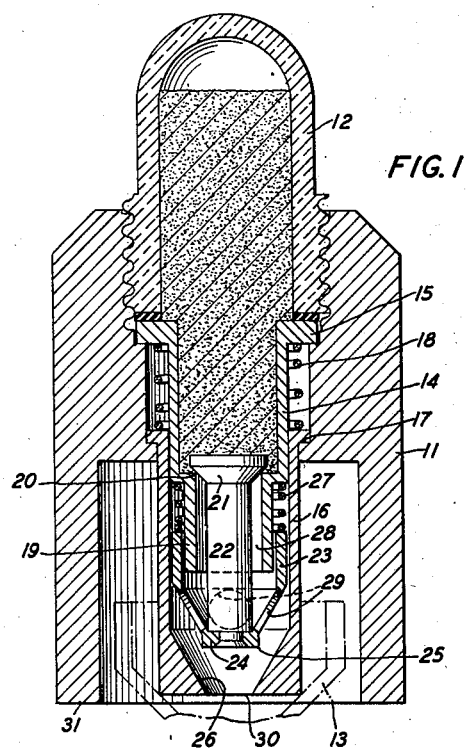
Fig. 1 is a sectional view of the dispenser attached to a storage vial and resting on a filling funnel.

In the drawing, the housing 11 is preferably of metal such as brass, threaded at its upper end to receive a storage vial 12 and open at the lower end to fit over a filling funnel 13. The inner bushing 14 is held in position by the vial 12 pressing against the flange 15 and the outer bushing 16 is slidably mounted on the bushing 14 and normally held on the annular seat 17 of the housing by the helical spring 18.

The bushing 14 has a lower portion 19 of reduced cross-section with a sharp edge 20 which serves as a seat for the upper valve 21 on the plunger 22. At its lower end the plunger carries a member 23 which slides on the lower portion 19 of the bushing 14 to keep the plunger in alignment and terminates in a circular end piece 24 having a sharp edge 25 which forms a lower valve with the inner sloping surface 26 of the bushing 16.

Figure 2:
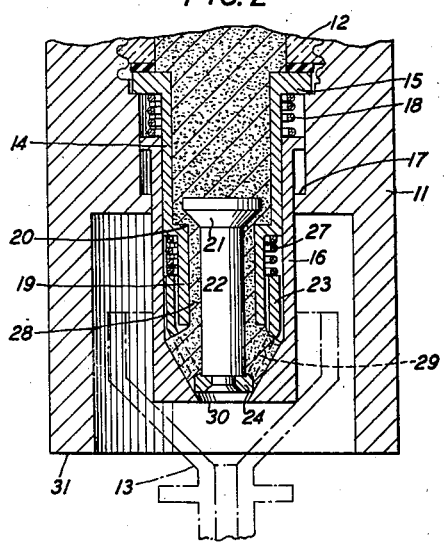
Fig. 2 is a partial section showing the inlet valve open to admit carbon to the measuring chamber.

In using the dispenser the housing is attached to a stoppage vial and the assembly placed in dispensing position on the filling nozzle 13, the upper valve being closed and the lower valve open as shown in Fig. 1. The dispenser is pressed down firmly and held for a brief interval such as two seconds, released and then held above the funnel for another brief interval. When the dispenser is pressed down, the outer bushing 16 being held against the funnel 13, remains stationary while the rest of the assembly moves down against the spring 18 until the sharp edge 25 engages the surface 26 and closes the lower valve. At this time both valves are closed but as the dispenser is further depressed the plunger 22 and the member 23 are constrained to remain stationary as the inner bushing 14 moves down compressing the spring 27, and opening the upper valve as shown in Fig. 2 to allow the carbon to flow down and fill the measuring chamber 28.

Figure 3:
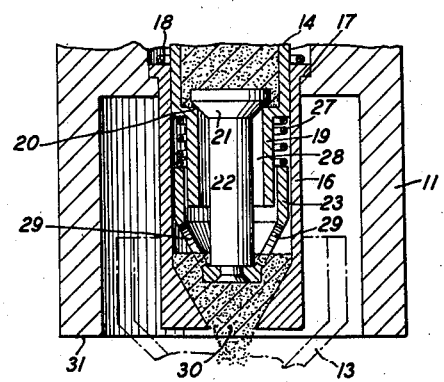
Fig. 3 is a partial section showing the outlet valve open to discharge the measured carbon.

When the dispenser is released the spring 18 forces the bushing 16 down until its flange engages the seat 17. During the first part of this downward movement of the bushing, spring 27 maintains a downward pressure on the member 23 so that the sharp edge 25 is kept in contact with the surface 26 until the valve 21 engages the seat 20. At this time both valves are closed and the chamber 28 contains a definite amount of carbon. The plunger 22 is restrained from further downward movement by the edge 20 but because of its greater range of travel the bushing 16 continues its motion until by the time it has engaged the seat 17, the surface 26 has moved away from the part 24 as shown in Fig. 3. The carbon then flows out of the chamber 28 through the circular holes 29 in the member 23 and through the discharge opening 30 in outer bushing to the funnel 13. When this operation is complete the dispenser assembly is put aside until needed again still in its vertical position and resting on the flat end 31 of the housing. The housing is preferably circular in cross-section so as to be unstable if laid flat. This tends to deter the user from unnecessarily agitating the carbon still in the vial.

What is claimed is:

1. A portable dispenser for granular material comprising a heavy housing having an upper end adapted to be attached to a container of the material to be dispensed and to make the dispenser stable with the container in an inverted position, inner and outer bushings forming for the material a measuring chamber having inlet and outlet valve seats, one of the valve seats being fixed with respect to the housing, a valve assembly comprising a plunger and opposed valves thereon for engaging the valve seats, and a spring engaging the valve assembly and holding the inlet valve against the inlet valve seat until the outlet valve has been closed.

2. In a dispensing device inner and outer bushings defining a measuring chamber, a plunger extending through the chamber and mounting inlet and outlet valves for the chamber, a member in sliding contact with the inner bushing for aligning the plunger within the chamber and a spring cooperating with the member and the inner bushing externally of the chamber to close the inlet valve.

3. In a dispensing device a housing, an inner bushing adapted to be held fixed within the housing, an outer bushing slidably mounted on the inner bushing and defining therewith a measuring chamber, a plunger extending through the chamber and having inlet and outlet valves for the chamber, a spring for normally holding the inlet valve closed and a second spring cooperating with the bushings for normally holding the outlet valve open, both of said springs being mounted externally of the measuring chamber.

4. In a dispensing device a housing, inner and outer relatively movable bushings mounted in the housing one of the bushings being adapted to remain fixed with respect to the housing and defining with the other bushing a measuring chamber for the material to be dispensed and having inlet and outlet valve seats, a plunger in the chamber mounting inlet and outlet valves for engaging the valve seats and two helical springs surrounding the inner bushing externally of the chamber for normally maintaining the inlet valve closed and the outlet valve open.

5. A portable dispensing device for granular material comprising a housing adapted to be attached to a container of the material to be dispensed and to form a relatively stable base for holding the container in inverted position, a fixed inner bushing in the housing having an upper portion forming a passage into the container and a lower portion of reduced cross-section having a sharp edge valve seat, a plunger having an upper valve thereon for engaging the seat, an outer bushing slidably mounted on the inner bushing projecting downwardly therefrom to a tapered outlet and forming with the lower portion of the inner bushing a measuring chamber for the material to be dispensed, a lower sharp-edged valve on the plunger adapted to seat on the taper outlet to close the chamber, a spring for maintaining the upper valve normally closed and a second spring for engaging the outer bushing for maintaining the lower valve normally open, both of said springs being mounted externally of the measuring chamber.

RAYMOND H. GRIEST.